United States Patent
Hayashi et al.

(10) Patent No.: US 9,053,347 B2
(45) Date of Patent: Jun. 9, 2015

(54) MEMORY DEVICE, HOST DEVICE, AND MEMORY SYSTEM

(75) Inventors: Takamichi Hayashi, Tokyo (JP);
Hiroshi Kuno, Kanagawa (JP);
Munetake Ebihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 413 days.

(21) Appl. No.: 13/048,532

(22) Filed: Mar. 15, 2011

(65) Prior Publication Data

US 2011/0239004 A1    Sep. 29, 2011

(30) Foreign Application Priority Data

Mar. 29, 2010 (JP) ................................. 2010-074334

(51) Int. Cl.
*G06F 21/79* (2013.01)
*H04L 9/32* (2006.01)

(52) U.S. Cl.
CPC .............. *G06F 21/79* (2013.01); *H04L 9/3263* (2013.01); *H04L 9/3271* (2013.01)

(58) Field of Classification Search
USPC ................................................ 711/100, 111
See application file for complete search history.

(56) References Cited

U.S. PATENT DOCUMENTS

| | | | |
|---|---|---|---|
| 6,457,067 B1 * | 9/2002 | Byers et al. ........................ 710/3 |
| 8,266,436 B2 * | 9/2012 | Akashika et al. ............. 713/175 |
| 2004/0068631 A1 * | 4/2004 | Ukeda et al. .................. 711/163 |
| 2005/0055557 A1 * | 3/2005 | Yamada et al. ............... 713/186 |
| 2006/0184809 A1 | 8/2006 | Kojou et al. |
| 2008/0010455 A1 * | 1/2008 | Holtzman et al. ............ 713/168 |

FOREIGN PATENT DOCUMENTS

| | | |
|---|---|---|
| JP | 2002-523816 | 7/2002 |
| JP | 2004-247799 | 9/2004 |
| WO | 00/10303 | 2/2000 |

* cited by examiner

*Primary Examiner* — David Le
(74) *Attorney, Agent, or Firm* — Dentons US LLP (57) ABSTRACT

A memory device includes: a storage unit that stores public key information of a certificate authority for verifying a certificate and includes a secret area storing data of which secrecy is assured; and a control unit that controls access to the storage unit depending on reception information, wherein the reception information includes information where access control information is added to certificate information authenticated by the certificate authority, and the control unit verifies the certificate using the public key, identifies the access control information, and limits the accessible secret area in the storage unit.

12 Claims, 12 Drawing Sheets

| | MSB | | | | | | | LSB |
|---|---|---|---|---|---|---|---|---|
| 04h | PAD 0 | PAD 1 | PAD 2 | PAD 3 | PAD 4 | PAD 5 | PAD 6 | PAD 7 |
| 05h | PAD 8 | PAD 9 | PAD 10 | PAD 11 | PAD 12 | PAD 13 | PAD 14 | PAD 15 |
| 06h | PAD 16 | PAD 17 | PAD 18 | PAD 19 | PAD 20 | PAD 21 | PAD 22 | PAD 23 |
| 07h | PAD 24 | PAD 25 | PAD 26 | PAD 27 | PAD 28 | PAD 29 | PAD 30 | PAD 31 |

| AUTHENTICATION STATES OF MEMORY (MEDIUM) | EXECUTION OR NOT |
|---|---|
| AUTH_INIT | OK |
| AUTH_PROCESS_1 | NG |
| AUTH_PROCESS_2 | NG |
| AUTH_SESSION_ESTABLISHED | NG |

| AUTHENTICATION STATES OF MEMORY (MEDIUM) | EXECUTION OR NOT |
|---|---|
| AUTH_INIT | NG |
| AUTH_PROCESS_1 | NG |
| AUTH_PROCESS_2 | NG |
| AUTH_SESSION_ESTABLISHED | OK |

Fig. 13

MEMORY DEVICE, HOST DEVICE, AND MEMORY SYSTEM

BACKGROUND OF THE INVENTION

1. Field of the Invention

The present invention relates to a memory device, a host device, and a memory system, in which the host device accesses a secret area storing secret data by authentication according to a certificate of the host device.

2. Description of the Related Art

As an external storage device of a host device such as a personal computer, a digital still camera, a digital video camera, a video instrument, or a game instrument, there is known a memory device equipped with a flash memory.

Figure 1:
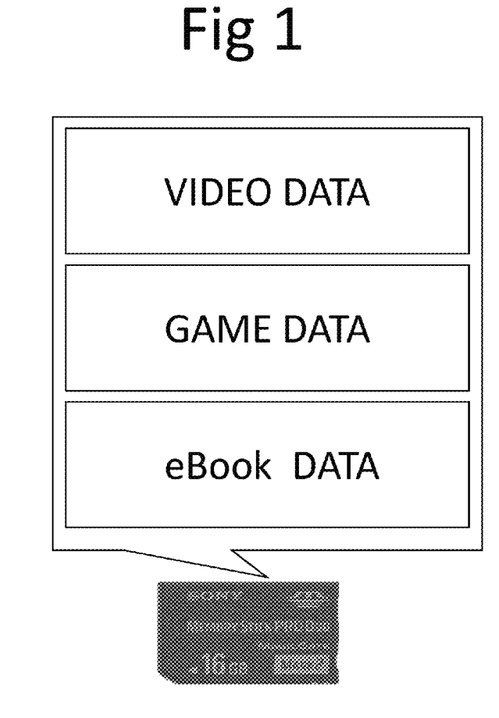
FIG. 1 is a diagram illustrating data examples written in a typical secret area.

The memory device used as an external storage device of various kinds of host devices includes a secret area 1 which is accessed only by an authenticated host device, for example, as shown in FIG. 1. When the host device includes a plurality of corresponding applications (videos, games, and so on), this secret area is divided into areas used for writing for the respective applications such as data for videos, data for games, and the like.

SUMMARY OF THE INVENTION

However, in a current memory system employing the host device and the memory device, an authenticated host can fully access the secret areas in a medium.

For this reason, when a plurality of hosts share the secret areas in the medium, there is a problem in that data recorded by other hosts can be read and written.

JP-T-2002-523816 or JP-A-2004-247799 discloses a technique where the above-described problem can be prevented by writing access control information in the memory device side which is a medium.

However, when it is necessary to change the access control, since it is necessary to change firmware of the medium, this is not practical.

It is desirable to provide a memory device capable of identifying attribute information of a host and limiting secret areas which are accessible, a host device, and a memory system.

According to an embodiment of the present invention, there is provided a memory device including a storage unit that stores public key information of a certificate authority for verifying a certificate and includes a secret area storing data of which secrecy is assured; and a control unit that controls access to the storage unit depending on reception information, wherein the reception information includes information where access control information is added to certificate information authenticated by the certificate authority, and wherein the control unit verifies the certificate using the public key, identifies the access control information, and limits the accessible secret area in the storage unit.

According to another embodiment of the present invention, there is provided a host device including a storage device that stores certificate information issued by at least a certificate authority; and a control unit that has a function to communicate with an external memory device including a secret area storing data of which secrecy in access and connection to the storage device is assured, wherein the control unit can transmit information where access control information is added to certificate information authenticated by a certificate authority as the certificate information, by the communication function.

According to still another embodiment of the present invention, there is provided a memory system including a host device; and a memory device that can communicate with the host device, wherein the host device includes a storage device that stores public key certificate information issued by at least a certificate authority; and a first control unit that has a function to communicate with an external memory device including a secret area storing data of which secrecy in access and connection of the storage device is assured, wherein the first control unit can transmit information where access control information is added to certificate information authenticated by a certificate authority as the certificate information, by the communication function, wherein the memory device includes: a storage unit that stores public key information of a certificate authority for verifying a certificate and includes a secret area storing data of which secrecy is assured; and a second control unit that controls access to the storage unit depending on information where access control information is added to certificate information authenticated by the certificate authority, transmitted from the host device, wherein the second control unit verifies the certificate using the public key, identifies the access control information, and limits the accessible secret area in the storage unit.

According to the embodiments of the present invention, it is possible to identify attribute information of a host, and to limit secret areas which are accessible.

DESCRIPTION OF THE PREFERRED EMBODIMENTS

Hereinafter, embodiments of the present invention will be described with reference to the accompanying drawings. The description will be made in the following order.

1. Schematic configuration of entire memory system
2. Configuration example of main parts of memory device
3. Configuration example of main parts of host device
4. Examples of certificate including attribute information
5. Communication sequence between host device and memory device <1. Schematic Configuration of Entire Memory System>

Figure 2:
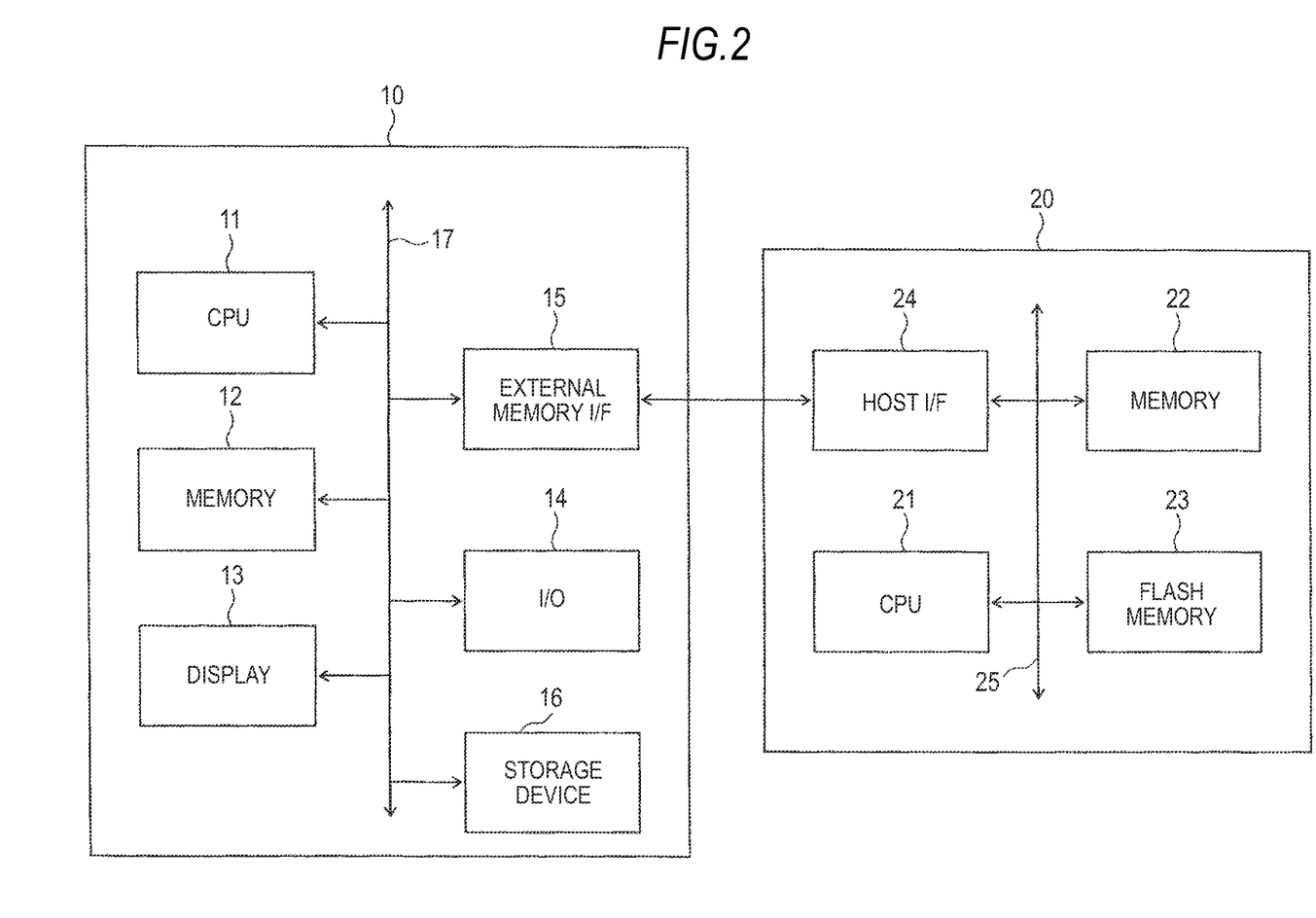
FIG. 2 is a diagram illustrating a schematic configuration of a memory system applied to this embodiment.

FIG. 2 is a diagram illustrating a schematic configuration of a memory system applied to an embodiment of the present invention.

As shown in FIG. 2, the memory system includes as main parts a host device 10 and a memory device 20 which is attachable and detachable to the host device 10. In this embodiment, the memory device 20 includes a flash memory which is a nonvolatile memory. The memory system in this embodiment is a system where the memory device 20 authenticates a host by the public key infrastructure (PKI), and access to secret areas in the memory device 20 is controlled by recording access control information in a public key certificate of the host device 10.

The host device 10 includes an electronic device such as a personal computer, a digital still camera, a digital video camera, a video instrument, a game instrument, or the like. The host device 10 has a CPU 11 as a first control unit, a memory 12, a display 13, an input and output processing (I/O) unit 14, and an external memory I/F (interface) 15. Also, the host device 10 has a storage device 16 which stores user data or data having high secrecy. The storage device 16 will be described later. The CPU 11 is mutually connected to the memory 12, the display 13, the I/O unit 14, the external memory I/F 15, and the storage device 16 via a bus 17. The memory 12 has a ROM which stores programs, a RAM which is a memory for work, and so on. The external memory I/F 15 transmits and receives data to and from the memory device 20 in response to control commands from the CPU 11.

The memory device 20 has a CPU 21 as a second control unit, a memory 22, a flash memory 23, and a host I/F 24. The CPU 21 is mutually connected to the memory 22, the flash memory 23, and the host I/F 24 via a bus 25. The memory 22 has a ROM which stores programs, a RAM which is a memory for work, and so on. The flash memory 23 includes, for example, NOR type or NAND type flash memory (nonvolatile memory). The host I/F 24 transmits and receives data to and from the host device 10 in response to control commands from the CPU 21.

<2. Configuration Example of Main Parts of Memory Device>

Figure 3:
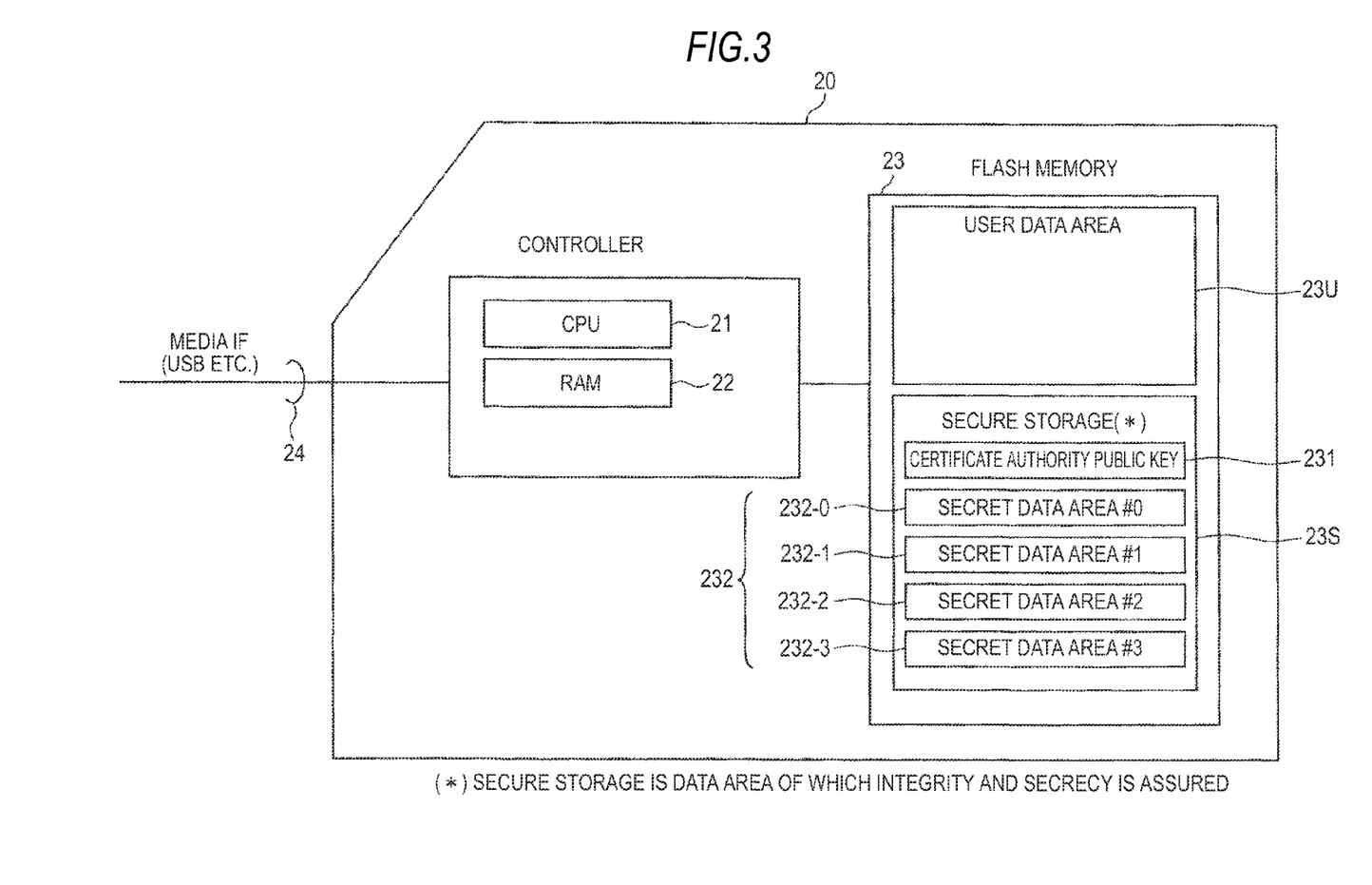
FIG. 3 is a block diagram illustrating a configuration of main parts of a memory device according to this embodiment.

First, a detailed configuration of the memory device 20 will be described. FIG. 3 is a block diagram illustrating a configuration example of main parts of the memory device 20 shown in FIG. 2.

The memory device 20 corresponds to, for example, a plate-shaped memory card, as shown in FIG. 3, and is accessed by the host device 10 according to authentication when installed in the host device 10, and data is read from or written in the memory device 20.

The memory device 20 in this embodiment has a function to authenticate a host by the public key infrastructure (PKI), receives the access control information added to the public key certificate of the host device 10, and performs the authentication process to control access to secret areas.

The flash memory 23 of the memory device 20 in this embodiment is divided into a user data area 23U where user data is read and written, and a secure storage area 23S where integrity and secrecy are assured.

The secure storage area 23S includes a certificate authority public key information area 231 for verifying the public key certificate of the host device 10, and a secret area 232 for storing data of which secrecy and integrity are to be assured. The secret area 232 is divided into plural secret data areas 232-0 to 232-3 which are allocated with addresses such as #0 to #3.

Figure 4:
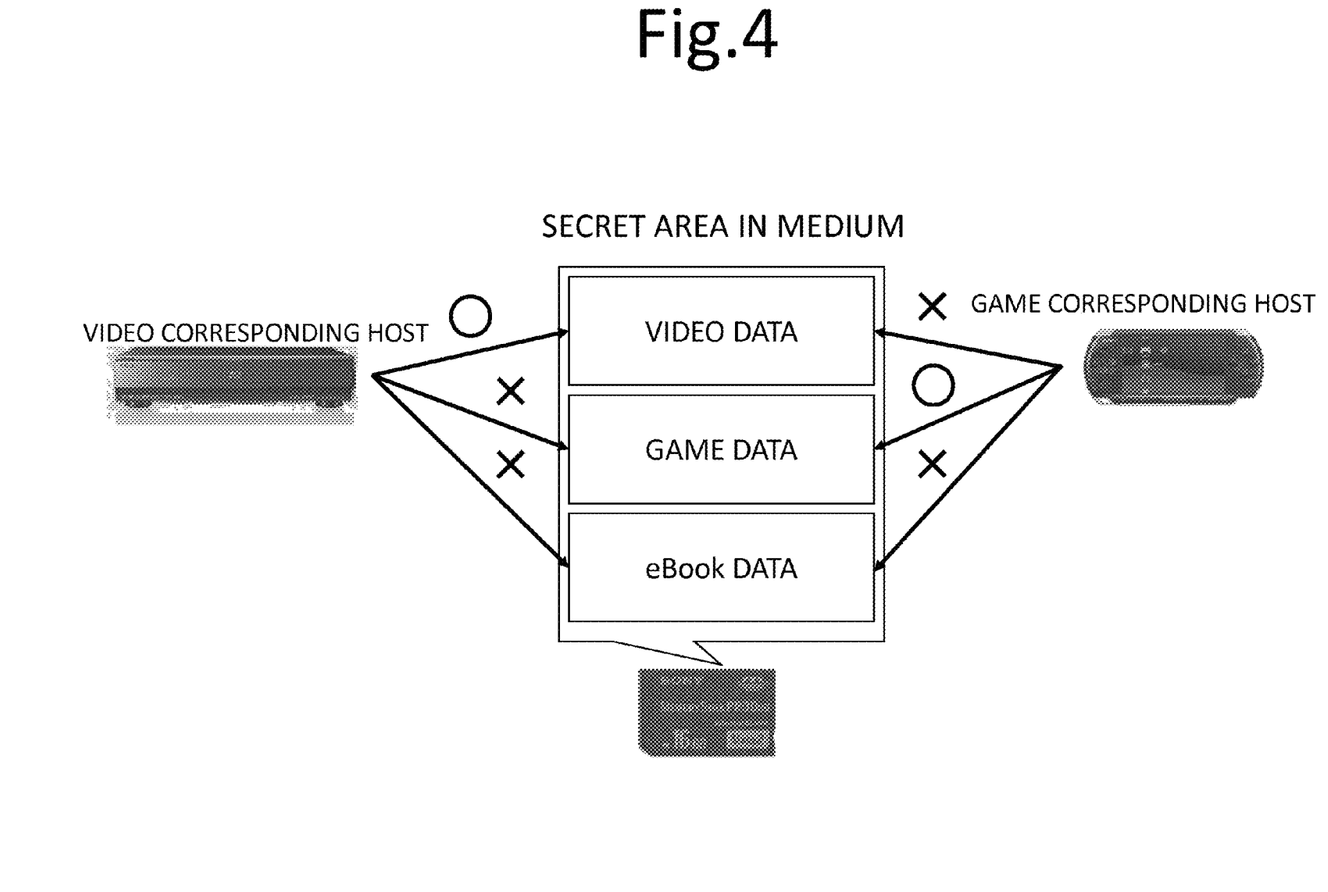
FIG. 4 is a diagram illustrating data examples written in a secret area and limitation of access to the data according to this embodiment.

The secret area 232 of the secure area 23S is the area which is accessed only by the host device 10 authenticated by the memory device 20, and the area used for writing is divided for each application as shown in FIG. 4.

In the example in FIG. 4, data for a video instrument is written in the secret data area 232-0 allocated with the address #0, and game data for a game instrument is written in the secret data area 232-1 allocated with the address #1. Further, data for an electronic book (eBOOK) is written in the secret data area 232-2 allocated with the address #2.

In this way, the data written in the secret area 232 is difficult to modify or see. Examples of data which is difficult to modify include rights information regarding the content (viewing time limit, number of reproduction times), user ID in delivery service, or the like. Examples of the data which is difficult to see include a key for decrypting encrypted content, a password in delivery service, credit card number, or the like.

The CPU 21 as a control unit of the memory device 20 authenticates the public key certificate of the host device 10, and, if authenticated, identifies attribute information added to the public key certificate, and limits a secret area in the medium which the host device 10 can access. In this way, in this embodiment, the authentication between the host device 10 and the memory device 20 uses the public key infrastructure. The CPU 21 has a function to perform the authentication.

The CPU 21 confirms an address of the accessible secret data area from the access control information (attribute information) added to the certificate of the received information. If confirming the address of the accessible secret data area, the CPU 21 transmits confirmation information, and decrypts response information responding to the transmitted confirmation information. Further, if confirming correspondence with a value of the transmitted confirmation information, the CPU 21 sends an authentication notification for notifying the authentication. More specifically, if confirming the address of the accessible secret data area from the access control information, the CPU 21 transmits a pseudorandom number and decrypts encrypted information responding to the transmitted pseudorandom number. If confirming correspondence with the transmitted pseudorandom number, the CPU 21 sends an authentication notification for notifying the authentication. If receiving an address of a secret data area in response to the authentication notification, the CPU 21 collates the address of the accessible secret data area confirmed from the access control information with the received address, and if they correspond with each other, transmits secret data of the address.

In this embodiment, in order to reduce keys held in the memory device 20, the cost for issuing keys, and the medium manufacturing cost, the following characteristic configuration is employed.

In this embodiment, secret areas which can be accessed by the host device 10 are written in (added to) the host certificate used in the public key authentication, as attribute information. The host certificate is a certificate which can be issued only by reliable certificate authorities. As described above, the secret area 232 is allocated with addresses (#0 to #3, or the like), and accessible addresses (#0 to #3, or the like) are written in the attribute information.

The memory device 20 controls access to the secret area from the host device 10 depending on the attribute information.

The memory device 20 may have only a public key (used to verify the host certificate) distributed from a certificate authority.

<3. Configuration Example of Main Parts of Host Device>

Next, a more detailed configuration of the host device 10 will be described.

Figure 5:
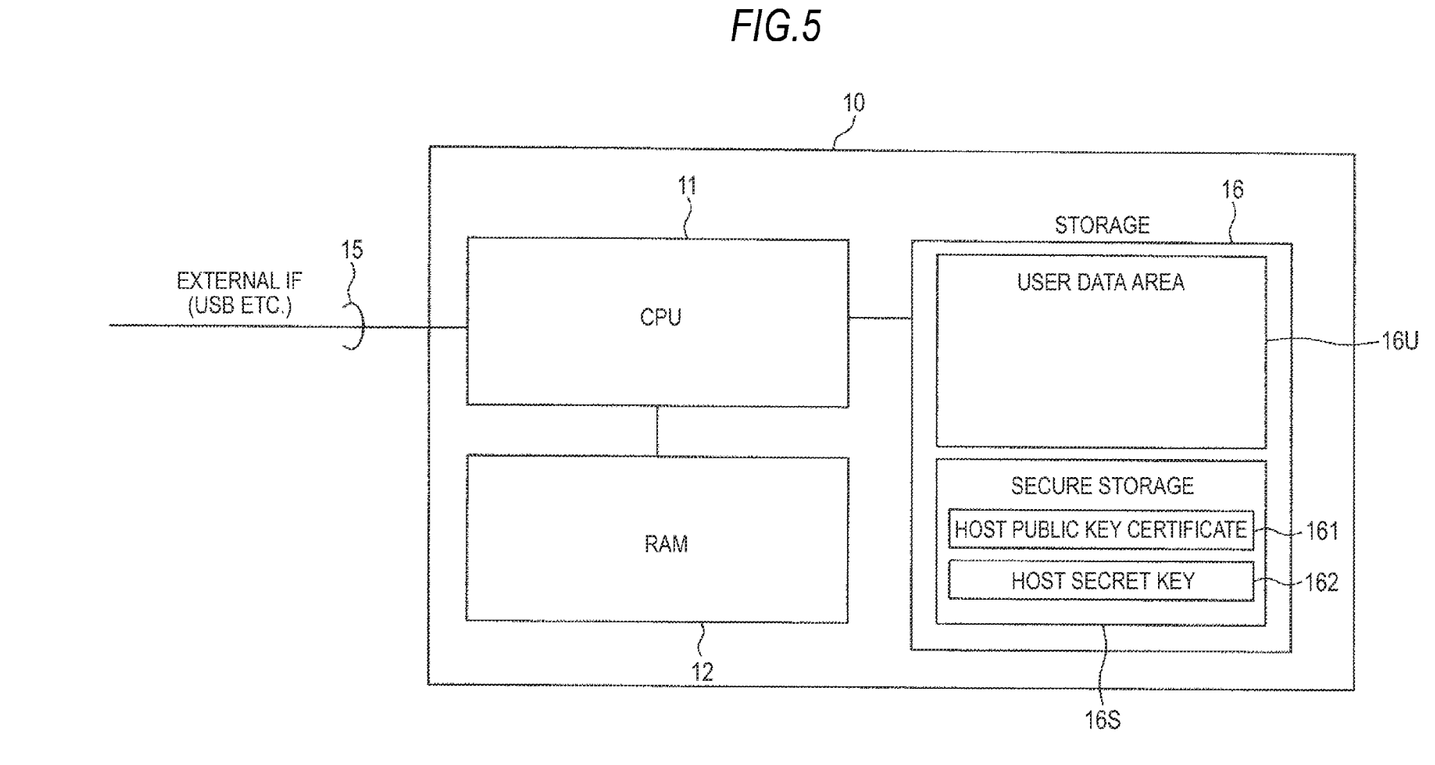
FIG. 5 is a block diagram illustrating a configuration of main parts of a host device according to this embodiment.

FIG. 5 is a block diagram illustrating a configuration example of main parts of the host device 10 shown in FIG. 2.

In the host device 10 in FIG. 5, the CPU 11, the memory 12 (RAM), and the storage device 16 are shown.

The storage device 16 of the host device 10 in this embodiment is divided into a user data area 16U where user data is read and written, and a secure storage area 16S where integrity and secrecy are assured.

The secure storage area 16S has a host public key information area 161 which stores public key certificate information of the host device 10, issued by a certificate authority, and a host secret key information area 162 which stores secret key information of the host device 10.

The following data is fundamentally written in the public key certificate of the host device 10, and includes a public key of the host device 10, the addresses (#0 to #3, or the like) of the secret data in the memory device 20 which the host device 10 can access, and a signature by a secret key of the certificate authority.

<4. Example of Certificate Including Attribute Information>

Figure 6:
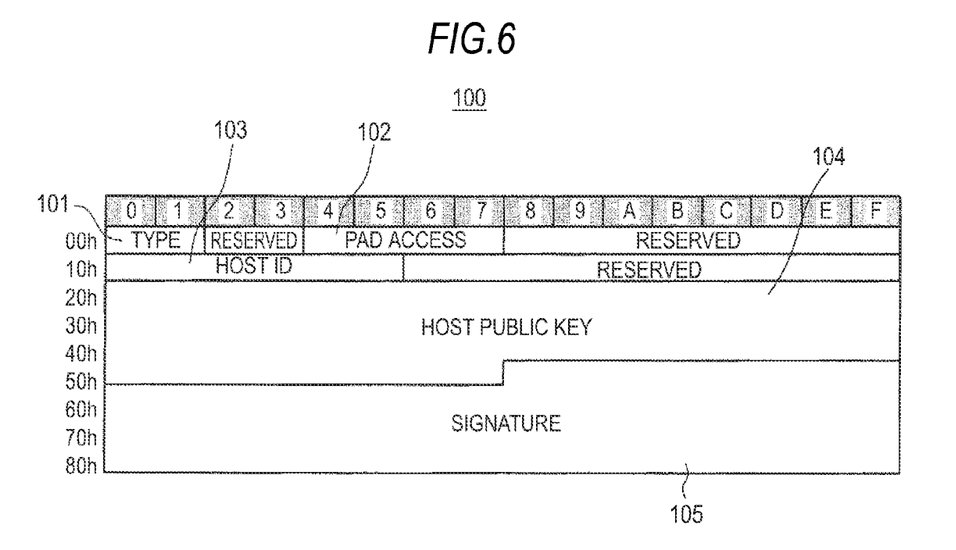
FIG. 6 is a diagram illustrating an example of a certificate of a host device according to this embodiment.

FIG. 6 is a diagram illustrating an example of the certificate of the host device 10 according to the embodiment.

The certificate (host certificate) 100 in FIG. 6 includes a type area 101, a PAD access (protected area data access) area 102 including attribute information, and a host ID area 103. The certificate 100 further includes a host public key area 104 and a signature area 105.

The type area 101 is formed with two bytes and stores a value indicating the type of the certificate. Specifically, 0001 h (=Host) is stored.

The PAD access area 102 is formed with four bytes and stores a value indicating a number of protected area data in the memory device 20, which the host device 10 can access. This information corresponds to the attribute information.

Figure 7:
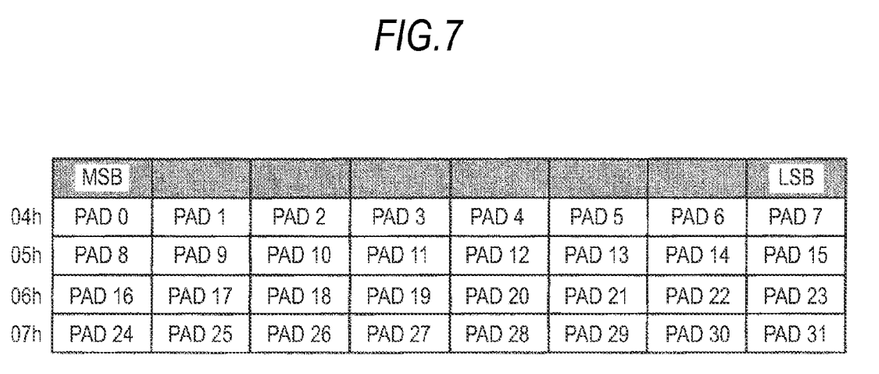
FIG. 7 is a diagram illustrating an example of a PAD access area including attribute information.

FIG. 7 is a diagram illustrating an example of the PAD access area 102 including the attribute information. The PAD access area 102 is constituted by thirty two flags PAD 0 to PAD 31, as shown in FIG. 7. Here, PAD N (1 bit) is $0<=N<32$. The PAD access area 102 stores $1b$ when the host device 10 can access the PAD N ($0<=N<32$). The PAD access area 102 stores $0b$ when the host device 10 may not access the PAD N. The protected area includes thirty two pieces of PAD. Area numbers from 0 to 31 may be assigned to the protected area. PAD 0 indicates the PAD assigned with the area number 0.

The host ID area 103 is formed with six bytes and stores the host ID of the host device 10.

The host public key area 104 is formed with 56 bytes and stores a public key for authentication of the host device 10.

The signature area 105 is formed with 56 bytes and stores a signature by the secret key. For example, when a signature is generated, the signature is obtained from the following calculation equation. [00 h-57 h] of the certificate 100 of the host device 10 is denoted by D.

$$ECDSA\_Sign(LApriv, D)$$

The signature is verified using the following calculation equation.

$$ECDSA\_Verify(LApub, Signature, D)$$

The CPU 11 has a function to communicate with the memory device 20. By this communication function, the CPU 11 can transmit information in which the access control information is added to the certificate information, to the memory device 20. If the CPU 11 receives confirmation information as a response to the transmitted information in which the access control information is added to the certificate information, the CPU 11 transmits response information responding to the received confirmation information to the memory device 20. More specifically, if receiving pseudorandom number as a response to the transmitted information in which the access control information is added to the certificate information and certificate information authenticated by the certificate authority, the CPU 11 transmits encrypted information responding to the received pseudorandom number to the memory device 20. If receiving the authentication notification, the CPU 11 can transmit an address of the secret area of the memory device 20 and receive secret data.

<5. Communication Sequence Between Host Device and Memory Device>

Figure 8:
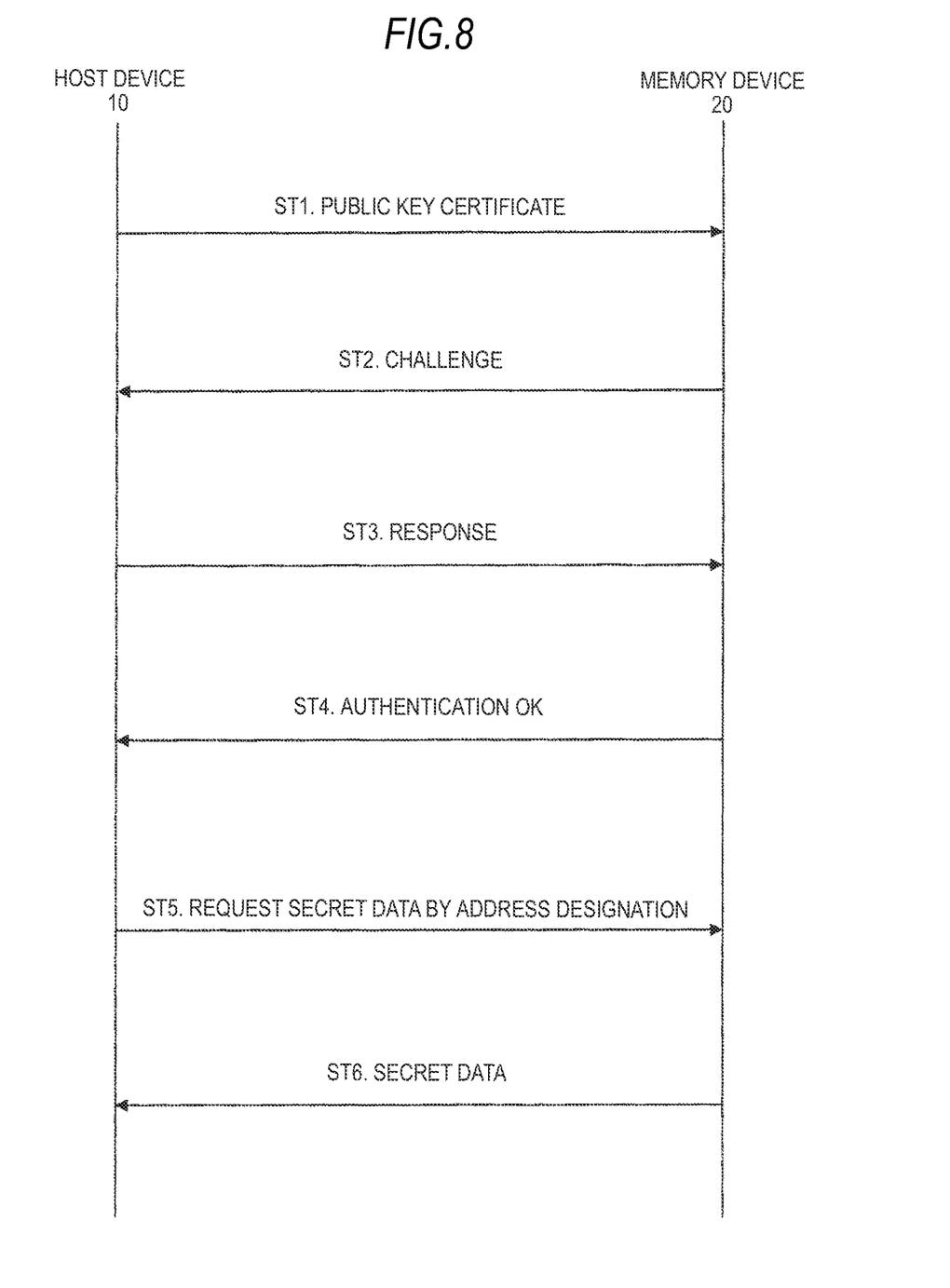
FIG. 8 is a diagram illustrating a fundamental communication sequence between the host device and the memory device according to this embodiment.

Next, a communication sequence between the host device 10 and the memory device 20 in this embodiment will be described. FIG. 8 is a diagram illustrating a fundamental communication sequence between the host device and the memory device in this embodiment.

In the memory system in this embodiment, authentication and key exchange are performed between the host device 10 and the memory device 20 which perform a process according to a protocol for sharing a bus key. In the memory system, the authentication between the host device 10 and the memory device 20 uses challenge and response methods. In the memory system, the key exchange between the host device 10 and the memory device 20 uses an ECDH (Elliptic Curve Diffie-Hellman).

[Step ST1]

At step ST1, the host device 10 transmits the public key certificate 100 to the memory device 20. The memory device 20 verifies the public key certificate by the public key of the certificate authority. The memory device 20 confirms an address of secret data which the host device 10 can access, from the access control information (attribute information) in the public key certificate.

[Step ST2]

At step ST ST2, the memory device 20 transmits a challenge (pseudorandom number) to the host device 10.

[Step ST3]

At step ST3, the host device 10 transmits a response (a value obtained by encrypting the challenge using the secret key of the host device 10) to the memory device 20.

[Step ST4]

At step ST4, the memory device 20 decrypts the response by the public key of the host device 10 and confirms whether the value transmitted by the challenge corresponds with the decrypted value. If the correspondence is confirmed, the memory device 20 notifies the host device 10 of the authentication.

[Step ST5]

At step ST5, the host device 10 transmits an address of secret data desired to be obtained to the memory device 20.

[Step ST6]

At step ST6, the memory device 20 collates the access control information obtained at step ST1 with the address at step ST5, and if they correspond with each other, transmits the secret data.

Figure 9:
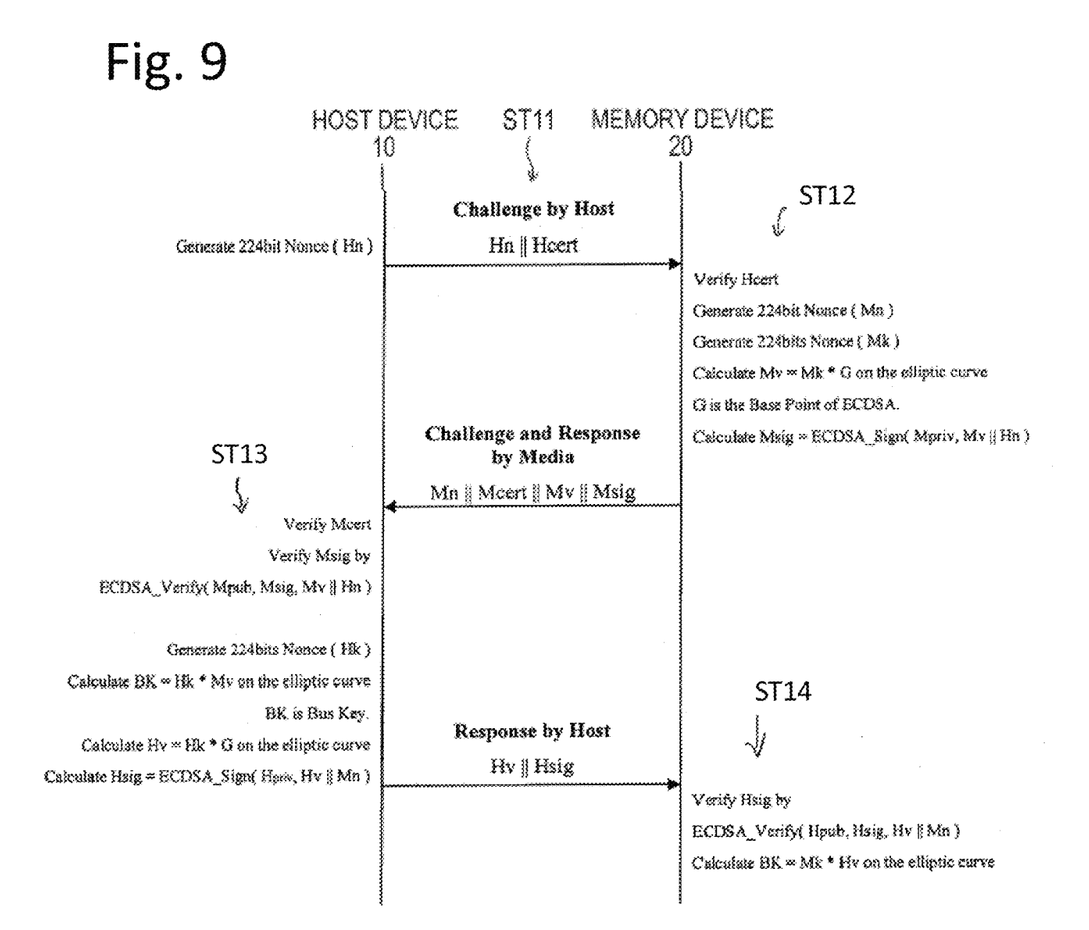
FIG. 9 is a diagram illustrating a detailed communication sequence between the host device and the memory device according to this embodiment.
Figure 10:
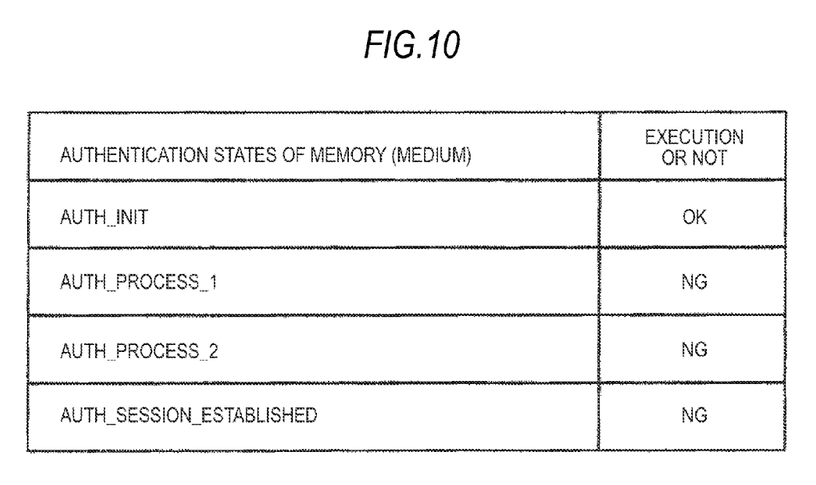
FIG. 10 is a diagram illustrating an example of correlation between an authentication state of the memory device and execution or not of a protocol in the process in FIG. 9.

Next, a detailed communication sequence between the host device 10 and the memory device 20 in this embodiment will be described. FIG. 9 is a diagram illustrating a detailed communication sequence for authentication between the host device and the memory device in this embodiment. Also, as shown in FIG. 10, authentication states of the memory device 20 include four state transitions, "AUTH_INIT," "AUTH_PROCESS_1," "AUTH_PROCESS_2," and "AUTH_SESSION_ESTABLISHED," and the protocol is assumed to be capable of being executed at the state "AUTH_INIT."

[Step ST11]

Step ST11 corresponds to challenge by a host where the host device 10 transmits information to the memory device 20, where the following process is performed. The host device 10 generates a nonce (random number) Hn of several tens or several hundreds of bits. The host device 10 transmits the nonce Hn and the host certificate Hcert to the memory device 20 (Challenge by Host).

[Step ST12]

At step ST12, the memory device 20 verifies if a type of the host certificate Hcert is 0001 h.

If the verification fails, the protocol is stopped, and the authentication state is moved to "AUTH_INIT." The memory device 20 verifies a signature of the host certificate Hcert. If the verification of the signature fails, the protocol is stopped, and the authentication state is moved to "AUTH_INIT." The memory device 20 generates a nonce Mn of several tens or several hundreds of bits. The memory device 20 generates a nonce Mk of several tens or several hundreds of bits. The memory device 20 obtains a point Mv on an elliptic curve from the following equation. A base point on the elliptic curve is denoted by G.

$$Mv=Mk*G$$

The memory device 20 obtains a signature Msig for the nonce Mv and the nonce Hn, from the following equation.

$$Msig=ECDSA\_Sign(Mpriv,Mv\|Hn)$$

The memory device 20 moves the authentication state from "AUTH_INIT" to "AUTH_PROCESS_1."

[Step ST13]

At step ST13, the host device 10 receives the nonce Mn, the memory certificate Mcert, the nonce Mv, and the signature Msig from the memory device 20 (Challenge and Response by Memory). The host device 10 verifies if a type of the certificate Mcert is 0002 h. If the verification fails, the protocol is stopped. The host device 10 verifies a signature of the certificate Mcert. If the verification of the signature fails, the protocol is stopped. The host device 10 verifies the signature Msig by the following calculation equation. If the verification fails, the protocol is stopped.

$$ECDSA\_Verify(Mpub,Msig,Mv\|Hn)$$

The host device 10 generates a nonce Hk of several tens or several hundreds of bits.

The host device 10 calculates the bus key BK for storage. The bus key becomes, for example, the lower 100 bits of an X coordinate value of a point Hk*Mv on the elliptic curve. The host device 10 obtains a point Hv on the elliptic curve from the following equation. A base point on the elliptic curve is denoted by G.

$$Hv=Hk*G$$

The host device 10 obtains a signature Hsig for the nonces Hv and Mn using the following equation.

$$Hsig=Sig(Hpriv,Hv\|Mn)$$

The host device 10 transmits the nonce Hv and the signature Hsig to the memory device 20 (Response by Host).

[Step ST14]

At step ST14, the memory device 20 verifies the signature Hsig by the following calculation equation. If the verification fails, the protocol is stopped.

$$ECDSA\_Verify(Hpub,Hsig,Hv\|Mn)$$

The memory device 20 calculates the bus key for storage. The bus key becomes the lower 100 bits of an X coordinate value of a point Mk*Hv on the elliptic curve. The memory device 20 moves the authentication state from "AUTH_PROCESS_1" to "AUTH_PROCESS_2."

Figure 11:
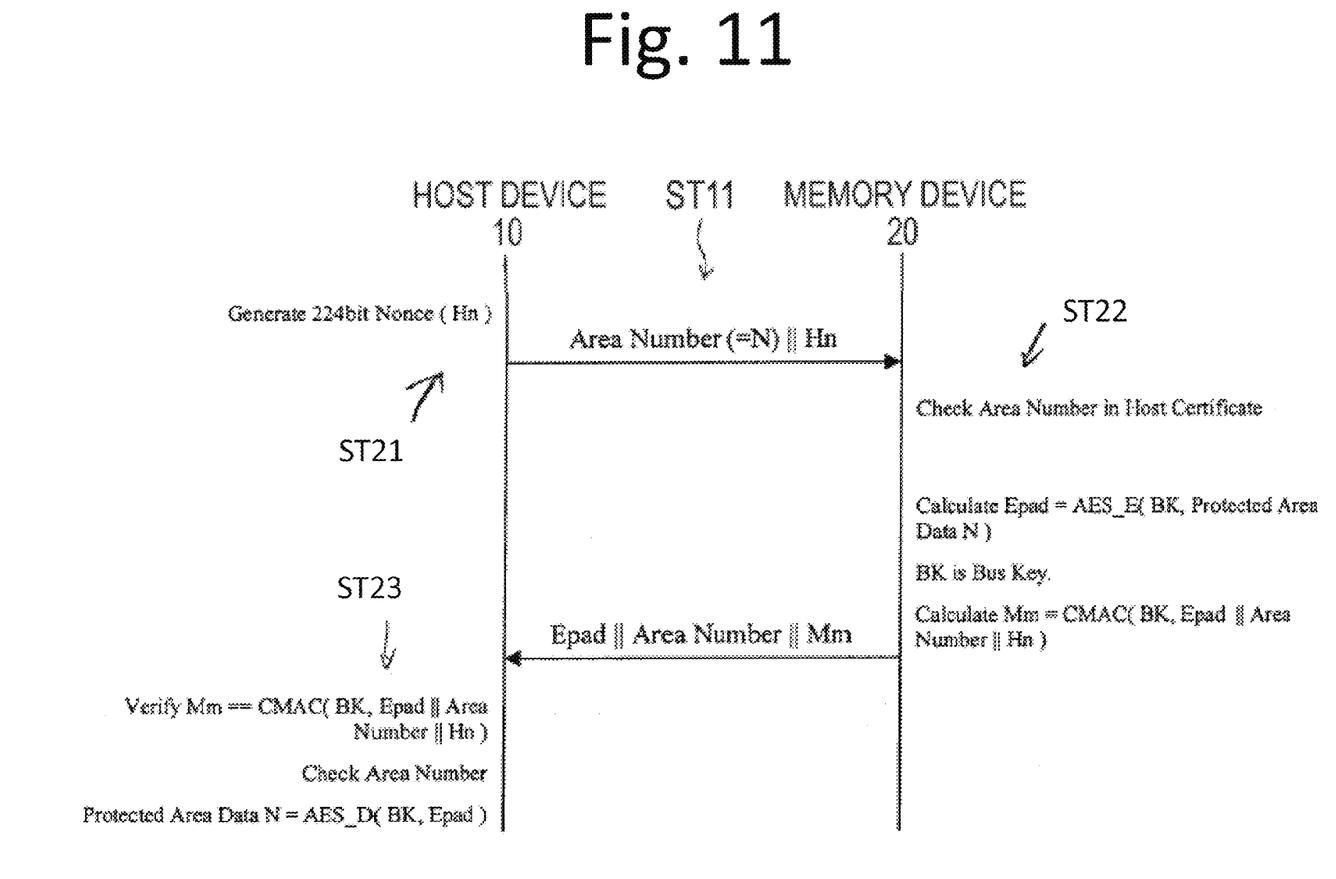
FIG. 11 is a diagram illustrating a detailed communication sequence for obtaining PAD between the host device and the memory device.
Figure 12:
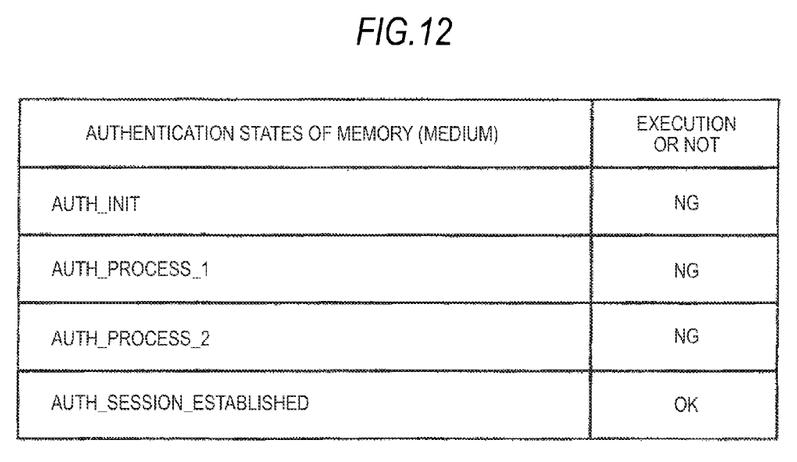
FIG. 12 is a diagram illustrating an example of correlation between an authentication state of the memory device and execution or not of a protocol in processes in FIGS. 11 and 13.

Next, a more detailed communication sequence for obtaining PAD between the host device 10 and the memory device 20 in this embodiment will be described. FIG. 11 is a diagram illustrating a detailed communication sequence for obtaining PDA between the host device and the memory device in the embodiment. Also, as shown in FIG. 12, authentication states of the memory device 20 include four state transitions, "AUTH_INIT," "AUTH_PROCESS_1," "AUTH_PROCESS_2," and "AUTH_SESSION_ESTABLISHED." The protocol is assumed to be capable of being executed at the state "AUTH_PROCESS_2."

The protocol is a protocol for obtaining PAD (protected area data) N of the memory device 20. As described above, it is necessary to complete the authentication between the host device 10 and the memory device 20 in advance. PAD (protected area data) which can be obtained by the host device 10 depends on the PAD access in the host certificate 100 in FIG. 6.

[Step ST 21]

At step ST21, the host device 10 generates a nonce Hn of several tens or several hundreds of bits. The host device 10 transmits an area number N of PAD (protected area data) to be obtained and the nonce Hn to the memory device 20.

[Step ST22]

At step ST22, the memory device 20 collates the area number received from the host device 10 with a value of the PAD access in the host certificate Hcert received by the authentication protocol. When it is not allowed for the host device 10 to access the PAD (protected area data) N, the protocol is stopped. The memory device 20 encrypts the PAD (protected area data) N using the following equation (=Epad). The bus key is denoted by BK.

$$Epad=AES\_E(BK,\text{Protected Area Data }N)$$

The memory device 20 calculates MAC (Mm) for Epad, the area number, and the nonce Hn using the following calculation equation.

$$Mm=CMAC(Epad\|\text{Area Number}\|Hn)$$

The memory device 20 transmits Epad, the area number, and the nonce Mm to the host device 10.

[Step ST23]

At step ST23, the host device 10 receives Epad, the area number, and the nonce Mm from the memory device 20. The host device 10 verifies if a following calculation result corresponds with the nonce Mm. If the verification fails, the protocol is stopped.

$$CMAC(BK,Epad\|\text{Area Number}\|Hn)$$

The host device 10 verifies if a value of the received area number is the same as the area number designated by itself at step ST21. If the verification fails, the protocol is stopped. The host device 10 decrypts Epad using the following equation and obtains the PAD (protected area data) N.

$$AES\_D(BK,Epad)$$

Figure 13:
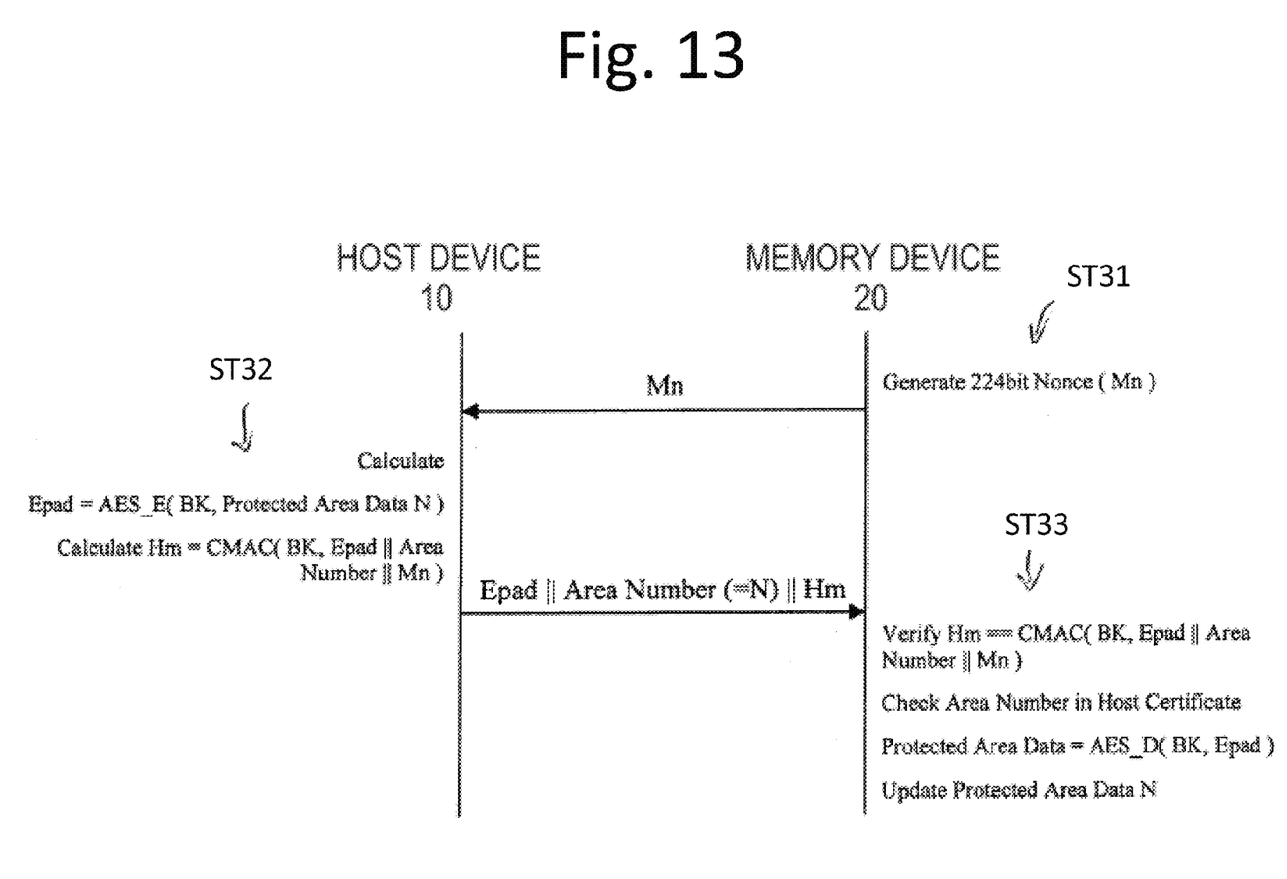
FIG. 13 is a diagram illustrating a detailed communication sequence for obtaining PDA between the host device and the memory device.

Next, a more detailed communication sequence for setting PAD between the host device 10 and the memory device 20 in this embodiment will be described. FIG. 13 is a diagram illustrating a detailed communication sequence for obtaining PAD between the host device and the memory device. Also, as shown in FIG. 12, authentication states of the memory device include four state transitions, "AUTH_INIT," "AUTH_PROCESS_1," "AUTH_PROCESS_2," and "AUTH_SESSION_ESTABLISHED." The protocol is assumed to be capable of being executed at the state "AUTH_SESSION_ESTABLISHED."

The protocol is a protocol for recording PAD (protected area data) N of the memory device 20. As described above, it is necessary to complete the authentication between the host device 10 and the memory device 20 in advance. The PAD (protected area data) that can be obtained by the host device 10 depends on the PAD access in the host certificate 100 in FIG. 6.

[Step S31]

At step ST31, the memory device 20 generates a nonce Mn of several tens or several hundreds of bits and transmits the nonce to the host device 10.

[Step ST32]

At step ST32, the host device 10 receives the nonce Mn from the memory device 20. The host device 10 encrypts the PAD (protected area data) N using the following equation (=Epad). The bus key is denoted by BK.

$$Epad = AES\_E(BK, \text{Protected Area Data } N)$$

The host device 10 calculates MAC (Hm) for Epad, the area number (=N), and the nonce Mn from the following equation.

$$Hm = CMAC(BK, Epad \| \text{Area Number} \| Mn)$$

The host device 10 transmits Epad and Hm to the memory device 20.

[Step ST33]

At step ST33, the memory device 20 verifies if Hm corresponds with the following value. If the verification fails, the protocol is stopped.

$$CMAC(BK, Epad \| \text{Area Number} \| Mn)$$

The memory device 20 collates the area number with a value of the PAD access in the host certificate received by the authentication protocol. When it is not allowed for the host device 10 to access the PAD (protected area data) N, the memory device 20 stops the protocol. The memory device 20 decrypts Epad using the following equation and obtains the PAD (protected area data) N.

$$AES\_D(BK, Epad)$$

The memory device 20 updates the PAD (protected area data) N.

As such, although this embodiment has been described in detail, the following configuration may be employed. When the host device 10 can access plural pieces of secret data, a plurality of addresses may be recorded in a public key certificate. Access to the secret data by the host device 10 is more finely controlled. For example, read normal/abnormal (Read OK/NG), write normal/abnormal (Write OK/NG), accessible time limit, or the like is controlled. Also, in this embodiment, the encryption algorithm has been described by exemplifying PKI, but may employ other algorithms.

According to this embodiment, it is possible to control addresses of secret areas which the host device can access. Also, when the access control information is changed, it is advantageous in that it is not necessary to change the memory device which is a medium.

The present invention is not limited to the above-described embodiment but may be appropriately modified without departing from the scope of the present invention.

The method described above in detail may be implemented by a program according to the above-described orders and may be executed in a computer such as a CPU. Also, such a program may be recorded in recording media such as semiconductor memories, magnetic disks, optical disks, or Floppy (registered trademark) disks, and, the program may be accessed by a computer installing the recording media and be executed.

The present application contains subject matter related to that disclosed in Japanese Priority Patent Application JP 2010-074334 filed in the Japan Patent Office on Mar. 29, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A memory device comprising:
   a storage unit that stores a public key of a certificate authority for verifying a certificate and includes a secure storage area in which secret data is stored; and
   a control unit that controls access to the storage unit based on reception information received from a host device,
   wherein,
       the reception information includes access control information that is added to the certificate authenticated by the certificate authority,
       the control unit verifies the certificate using the public key, identifies the access control information, and limits the access to the secure storage area in the storage unit,
       the secure storage area in the storage unit is divided into a plurality of addressable secret data areas,
       the access control information includes a first address of one of the plurality of addressable secret data areas in the storage unit, and
       the control unit confirms the first address of the access control information added to the certificate of the reception information received from the host device and collates the confirmed first address with a second address received from the host device.

2. The memory device according to claim 1, wherein when upon confirming the first address of the access control information, the control unit transmits confirmation information, decrypts response information responding to the transmitted confirmation information, and sends an authentication notification upon confirming correspondence with a value of the transmitted confirmation information.

3. The memory device according to claim 1, wherein upon confirming the first address of the addressable secret data area in the access control information, the control unit transmits a pseudorandom number, decrypts encrypted information responding to the transmitted pseudorandom number, and sends an authentication notification upon confirming correspondence with a value of the transmitted pseudorandom number.

4. The memory device according to claim 2, wherein when receiving the second address in response to the authentication notification, the control unit transmits secret data associated with the second address upon determining that the second address corresponds to the confirmed first address of the reception information.

5. A host device comprising:
a storage device that stores a certificate issued by at least a certificate authority; and
a control unit that communicates with an external memory device including a secure storage area in which secret data is stored,
wherein,
the control unit transmits access control information, which is added to the certificate, to the external memory device for confirmation,
the secure storage area in the external memory device is divided into a plurality of addressable secret data areas,
the access control information includes a first address of one of the plurality of addressable secret data areas of the external memory device, and
the control unit (a) receives a response from the external memory device confirming the first address of the access control information added to the certificate, (b) sends a request for secret data of a second address when the first address has been confirmed by the external memory device, and (c) receives secret data of the second address after the external memory device collates the confirmed first address with the second address and determines correspondence therebetween.

6. The host device according to claim 5, wherein upon receiving confirmation information as the response from the external memory device to the transmitted information in which the access control information is added to certificate, the control unit transmits response information responding to the received confirmation information.

7. The host device according to claim 5, wherein upon receiving a pseudorandom number as the response from the external memory device, the control unit transmits encrypted information responding to the received pseudorandom number.

8. The host device according to claim 6, wherein upon receiving an authentication notification, the control unit transmits the second address to the external memory device.

9. A memory system comprising:
a host device; and
an external memory device that can communicate with the host device,
wherein,
the host device includes (a) a storage device that stores a certificate issued by at least a certificate authority, and (b) a first control unit that communicates with the external memory device including a secure storage area in which secret data is stored,
the first control unit transmits access control information, which is added to the certificate authenticated by the certificate authority, to the external memory device for confirmation,
the external memory device includes (a) a storage unit that (i) stores a public key of the certificate authority for verifying the certificate and (ii) includes the secure storage area in which secret data is stored, and (b) a second control unit that controls access to the storage unit based on the access control information that is added to the certificate, transmitted the access control information being received by the external memory device from the host device,
the second control unit verifies the certificate using the public key, identifies the access control information, and limits access to the secure storage area in the storage unit,
the secure storage area in the storage unit is divided into a plurality of addressable secret data areas,
the access control information includes a first address of one of the plurality of addressable secret data areas, and
the second control unit confirms the first address of the access control information added to the certificate and collates the confirmed first address of the access control information received from the host device with a second address received from the host device.

10. The memory system according to claim 9, wherein:
upon confirming the first address of the access control information, the second control unit transmits confirmation information, decrypts response information responding to the transmitted confirmation information, and sends an authentication notification to the host device upon confirming correspondence with a value of the transmitted confirmation information, and
upon receiving confirmation information as a response to the transmitted information in which the access control information is added to the certificate authenticated by the certificate authority, the first control unit transmits response information responding to the received confirmation information to the external memory device.

11. The memory system according to claim 9, wherein:
upon confirming the first address of the access control information, the second control unit transmits a pseudorandom number, decrypts encrypted information responding to the transmitted pseudorandom number, and sends an authentication notification to the host device upon confirming correspondence with a value of the transmitted pseudorandom number, and
upon receiving the pseudorandom number as a response to the transmitted information in which the access control information is added to the certificate authenticated by the certificate authority, the first control unit transmits encrypted information responding to the received pseudorandom number to the external memory device.

12. The memory system according to claim 10, wherein:
upon receiving the authentication notification, the first control unit transmits the second address to the external memory device, and
when receiving the second address in response to the authentication notification, the second control unit transmits secret data of the associated with the second address upon determining that the second address corresponds to the confirmed first address of the access control information.

* * * * *